United States Patent
Nakasato

(10) Patent No.: US 9,226,207 B2
(45) Date of Patent: Dec. 29, 2015

(54) COMMUNICATION TERMINAL, COMMUNICATION SYSTEM, AND METHOD FOR OPERATING COMMUNICATION TERMINAL

(75) Inventor: Yuuki Nakasato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 398 days.

(21) Appl. No.: 13/640,230

(22) PCT Filed: Apr. 15, 2011

(86) PCT No.: PCT/JP2011/059409
§ 371 (c)(1), (2), (4) Date: Oct. 9, 2012

(87) PCT Pub. No.: WO2011/129440
PCT Pub. Date: Oct. 20, 2011

(65) Prior Publication Data
US 2013/0028222 A1 Jan. 31, 2013

(30) Foreign Application Priority Data
Apr. 16, 2010 (JP) ................................. 2010-095508

(51) Int. Cl.
H04W 36/08 (2009.01)
H04W 72/12 (2009.01)
H04W 88/02 (2009.01)

(52) U.S. Cl.
CPC .............. *H04W 36/08* (2013.01); *H04W 72/12* (2013.01); *H04W 88/02* (2013.01)

(58) Field of Classification Search
USPC ................................................ 370/329, 331
See application file for complete search history.

(56) References Cited

U.S. PATENT DOCUMENTS 7,529,214 B2* 5/2009 Omae ..................... H04L 45/00 370/331
7,876,679 B2* 1/2011 Hirsimaki et al. ............ 370/231
(Continued)

FOREIGN PATENT DOCUMENTS

JP 2001-061174 A 3/2001
JP 2002-016570 A 1/2002
(Continued)

OTHER PUBLICATIONS

Association of Radio Industries and Businesses OFDMA/TDMA TDD Broadband Wireless Access System (Next Generation PHS) ARIB Standard, ARIB STD-T95 Version 1.3, Dec. 16, 2009.
(Continued)

*Primary Examiner* — Jenee Williams
(74) *Attorney, Agent, or Firm* — Procopio, Cory, Hargreaves & Savitch, LLP.

(57) ABSTRACT

A communication terminal (30) includes a wireless communication unit (31) for transmitting and receiving radio signals, and a determination unit (transmission/reception timing adjustment unit 132) for determining a transmission period and a reception period in which the wireless communication unit (31) transmits and receives radio signals. In a case where a connection destination is switched from a first communication device currently in communication into a second communication device, when the second communication device transmits a predetermined signal in a transmission period for the communication with the first communication device, the determination unit changes a part of the transmission period for the communication with the first communication device into a reception period, to receive the predetermined signal from the second communication device.

4 Claims, 8 Drawing Sheets

(56) References Cited

U.S. PATENT DOCUMENTS

| | | |
|---|---|---|
| 2005/0141454 A1* | 6/2005 | Jain et al. ............... 370/331 |
| 2005/0254442 A1 | 11/2005 | Proctor, Jr. et al. |
| 2006/0007889 A1* | 1/2006 | Khan ....................... 370/331 |
| 2006/0034223 A1* | 2/2006 | Kim et al. ............... 370/331 |
| 2006/0227743 A1* | 10/2006 | Ishimori et al. ......... 370/331 |
| 2007/0066220 A1 | 3/2007 | Proctor, Jr. et al. |
| 2007/0070892 A1* | 3/2007 | Lee et al. ............... 370/229 |
| 2007/0195756 A1* | 8/2007 | Komiya et al. ......... 370/362 |
| 2007/0230423 A1* | 10/2007 | Yoshida et al. ......... 370/338 |
| 2008/0080556 A1* | 4/2008 | Shimada ................. 370/470 |
| 2008/0101295 A1* | 5/2008 | Tomita et al. .......... 370/331 |
| 2010/0070627 A1* | 3/2010 | Miyazaki et al. ....... 709/224 |
| 2010/0246514 A1* | 9/2010 | Jeon .................. H04W 84/12 370/329 |
| 2011/0151877 A1* | 6/2011 | Tafreshi ................. 455/442 |
| 2011/0188398 A1* | 8/2011 | Baba et al. ............. 370/252 |

FOREIGN PATENT DOCUMENTS

| | | |
|---|---|---|
| JP | 2003-333646 A | 11/2003 |
| JP | 2008-503907 A | 2/2008 |
| JP | 2009-206810 A | 9/2009 |
| JP | 2010-010806 A | 1/2010 |
| WO | 2010/024288 A1 | 3/2010 |

OTHER PUBLICATIONS

International Preliminary Report on Patentability and Written Opinion of the International Searching Authority issued by Japan Patent Office for the International Application No. PCT/JP2011/059409.

Office Action dated Feb. 4, 2014, issued in counterpart Japanese application No. 2010-095508.

* cited by examiner

F I G. 4
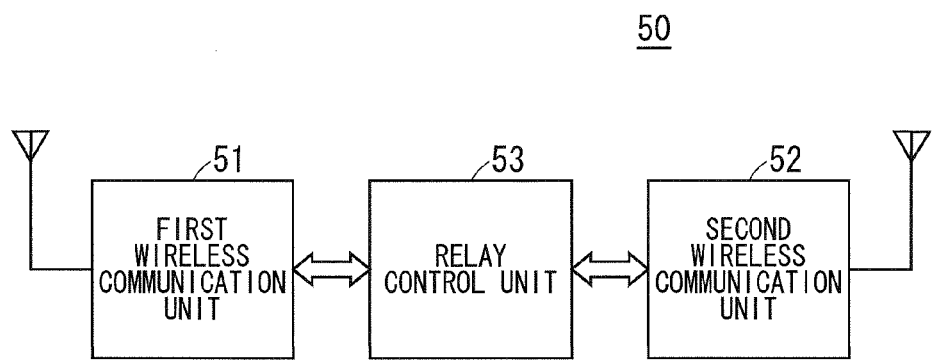
F I G. 5
| SWITCHING DESTINATION | RELAY DESTINATION |
|---|---|
| ANOTHER BASE STATION | |
| RELAY DEVICE | THE SAME BASE STATION |
| | ANOTHER BASE STATION |

COMMUNICATION TERMINAL, COMMUNICATION SYSTEM, AND METHOD FOR OPERATING COMMUNICATION TERMINAL

TECHNICAL FIELD

The present invention relates to a communication technology.

BACKGROUND ART

Conventionally, various techniques have been proposed for a communication system. For example, Non-Patent Document 1 discloses a standard for a communication system called a next-generation PHS (Personal Handyphone System). This standard is called XGP (eXtended Global Platform).

PRIOR-ART DOCUMENTS

Non-Patent Documents

Non-Patent Document 1: "OFDMA/TDMA TDD Broadband Wireless Access System (Next Generation PHS) ARIB STANDARD", ARIB STD-T95 Version 1.3, Dec. 16, 2009, Association of Radio Industries and Businesses

SUMMARY OF THE INVENTION

Problems to be Solved by the Invention

A mobile communication terminal sometimes performs communication with a base station while moving. In such a case, as the communication terminal is away from a base station currently in communication therewith, the communication quality of communication between the communication terminal and the base station deteriorates, and when the communication terminal is further away from the base station, the communication terminal can no longer communicate with the base station.

Therefore, in order to continue the communication even while movement, if the communication quality of communication with the base station currently in communication with the communication terminal has deteriorated, the communication terminal performs a handover for switching a connection destination from this base station to another base station having good communication quality.

On the other hand, in a communication system, in a case where a communication terminal exists in a place having a poor coverage for radio waves from a base station, for example, behind a building or inside a building, the base station may not be capable of direct communication with the communication terminal. In this case, in the communication system, a relay device is located at an appropriate position, to allow communication between the base station and the communication terminal via the relay device.

However, in the communication with interposition of the relay device, sometimes a signal cannot be relayed in real time because of a processing delay in the relay device.

In the XGP, communication between a communication terminal and a connection destination is performed with transmission/reception timings being fixedly synchronized. Accordingly, there is a possibility that a relay device that cannot relay a signal without a delay cannot serve as a new connection destination to which a handover is made. Therefore, a communication device, such as this relay device, whose transmission/reception timings of transmitting and receiving radio signals are different from those of another communication device exists in the communication system, it is difficult to perform a handover for switching a connection destination, and thus the communication may be lost.

Therefore, the present invention is made in view of the above-described points, and an object of the present invention is to provide a technique that can increase the possibility of implementing a handover while continuing communication.

Means for Solving the Problems

A communication terminal according to the present invention includes a communication unit for transmitting and receiving radio signals, and a determination unit for determining a transmission period and a reception period in which the communication unit transmits and receives radio signals, wherein, in a case where a connection destination is switched from a first communication device currently in communication with the communication unit into a second communication device, when the second communication device transmits a predetermined signal in a transmission period for the communication with the first communication device, the determination unit changes a part of the transmission period for the communication with the first communication device into a reception period, to receive the predetermined signal from the second communication device.

In one aspect of the communication terminal according to the present invention, a channel allocation restriction unit for restricting allocation of an individual channel in a radio resourse is further provided, and the channel allocation restriction unit causes the first communication device to restrict allocation of the individual channel in a period that is changed from a transmission period into a reception period by the determination unit.

In one aspect of the communication terminal according to the present invention, either one of the first communication device and the second communication device is a relay device that relays a radio signal, and the relay device transmits a received radio signal after a certain time period elapses from the reception.

In one aspect of the communication terminal according to the present invention, a relay destination of the relay device is a third communication device different from the first communication device, and the channel allocation restriction unit causes the relay destination to restrict allocation of the individual channel in a period other than a period that is changed from a transmission period into a reception period by the determination unit.

A communication system according to the present invention includes a communication terminal, and a plurality of communication devices associated with the communication terminal. The plurality of communication devices include a first communication device and a second communication device. The communication terminal includes a communication unit for transmitting and receiving radio signals, and a determination unit for determining a transmission period and a reception period in which the communication unit transmits and receives radio signals. In a case where a connection destination is switched from the first communication device currently in communication with the communication unit into the second communication device, when the second communication device transmits a predetermined signal in a transmission period for the communication with the first communication device, the determination unit changes a part of the transmission period for the communication with the first communication device into a reception period, to receive the predetermined signal from the second communication device.

A method for operating a communication terminal according to the present invention includes the steps of a) performing wireless communication with a first communication device, and b) in a case where a connection destination is switched from the first communication device currently in communication into a second communication device, when the second communication device transmits a predetermined signal in a transmission period for the communication with the first communication device, changing a part of the transmission period for the communication with the first communication device into a reception period, to receive the predetermined signal from the second communication device.

Effects of the Invention

In the present invention, the possibility of implementing a handover while continuing communication can be increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 A block diagram showing a configuration of a relay device.

FIG. 5 A diagram showing a switching destination in a handover.

EMBODIMENT FOR CARRYING OUT THE INVENTION

In the following, an embodiment of the present invention will be described with reference to the drawings.

Embodiment

Outline of Configuration

Figure 1:
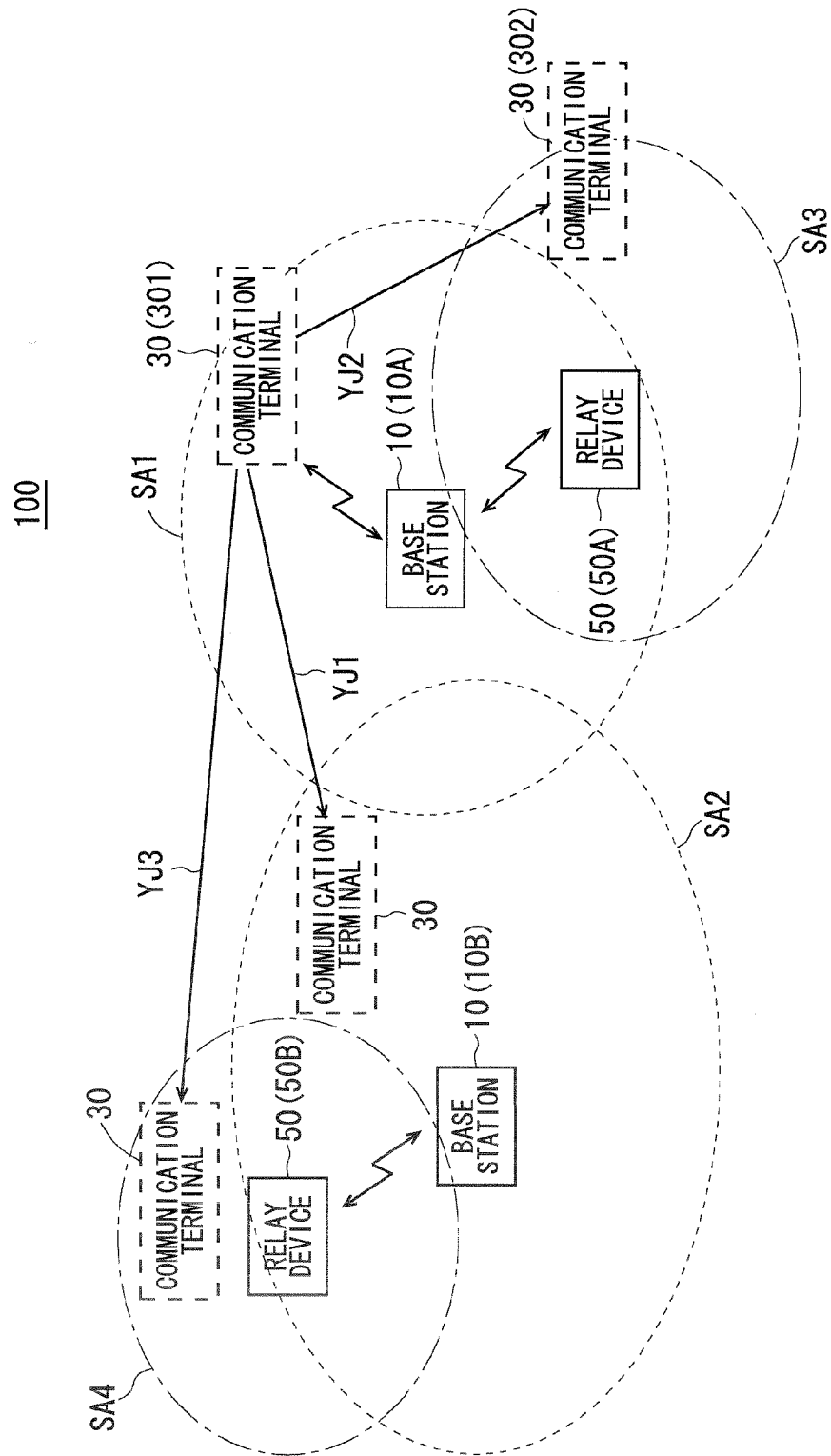
FIG. 1 A diagram showing a configuration of a wireless communication system according to this embodiment.

FIG. 1 is a diagram showing a configuration of a wireless communication system (communication system) 100 according to this embodiment.

As shown in FIG. 1, the wireless communication system 100 according to this embodiment is a communication system in the XGP that is a normal standard of the next-generation PHS, and includes a base station 10 (10A, 10B) and a relay device (also referred to as "relay station") 50 serving as communication devices, and a communication terminal (also referred to as "mobile station") 30.

The base station 10A (10B) performs bi-directional wireless communication with a plurality of communication terminals (only one communication terminal 30 is shown in FIG. 1 for descriptive convenience) existing in a communicable area (service area) SA1 (SA2) by a communication scheme using the OFDMA (Orthogonal Frequency Division Multiple Access). More specifically, the base station 10 individually allocates, among wireless radio wave resources (also referred to as "radio resource") identified on two dimensions having a time axis and a frequency axis, a particular radio resource to each of the plurality of communication terminals, and thereby can simultaneously communicate with the plurality of communication terminals. The base station 10 has an array antenna as a transmission/reception antenna, and, by using the adaptive array antenna scheme, can orient the directivity of the array antenna to a desired wave.

The base station 10 is connected to another base station via a network (not shown) serving as a backbone network, and thus implements communication between communication terminals located remote from each other.

The relay device 50A (50B) of the wireless communication system 100 expands the communicable area (service area) SA1 (SA2) of the base station 10A (10B), to enable the base station 10A (10B) to communicate with the communication terminal existing outside the service area SA1 (SA2). For example, in FIG. 1, a communication terminal 302 does not exist in the service area SA1 of the base station 10A but exists in a service area SA3 of the relay device 50A, and therefore can communicate with the base station 10A via the relay device 50A.

Here, a case is assumed where a communication terminal 301 communicating with the base station 10A moves, for example, in a direction of the arrow YJ1 in FIG. 1. As the communication terminal 301 is away from the base station 10A, the communication quality (also referred to as "communication state") of communication between the communication terminal 301 and the base station 10A deteriorates. When the communication terminal 301 further moves in the direction of the arrow YJ1, the communication terminal 301 goes out of the service area SA1 of the base station 10A, so that the communication terminal 301 can no longer communicate with the base station 10A.

In a case where the communication quality of communication between the communication terminal 301 and the base station 10A currently connected to this communication terminal 301 has deteriorated due to such movement of the communication terminal 301, the communication terminal 301 performs a handover operation for switching a connection destination that is a communication partner.

[Specific Configuration]

Figure 2:
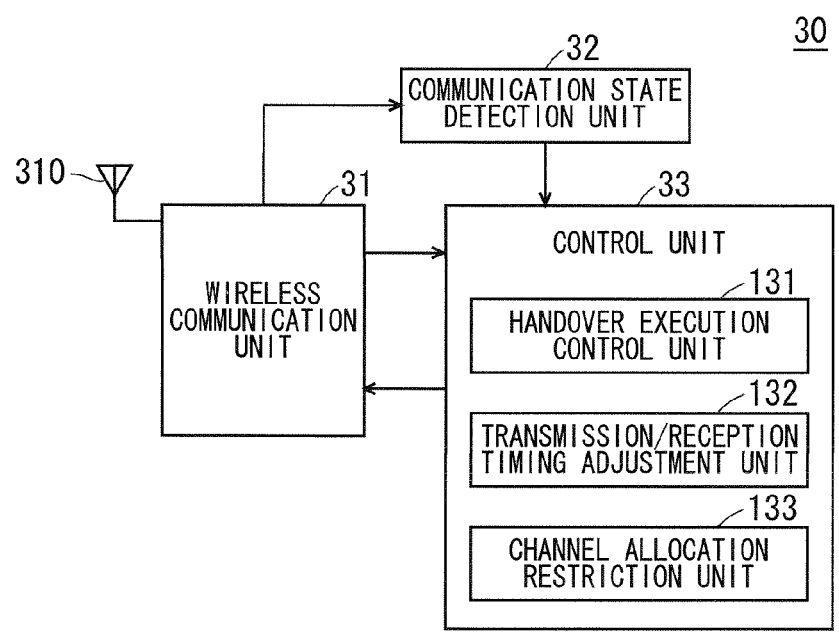
FIG. 2 A block diagram showing a configuration of a communication terminal.

In the following, a detailed description will be given to specific configurations of the communication terminal 30 and the relay device 50 included in such a wireless communication system 100. FIG. 2 is a block diagram showing a configuration of the communication terminal 30.

As shown in FIG. 2, the communication terminal 30 includes a wireless communication unit 31 for performing wireless communication, a communication state detection unit 32, and a control unit 33 for performing an overall control of the communication terminal 30.

The wireless communication unit 31 performs a predetermined process, such as an amplification process and down-conversion, on an OFDM (Orthogonal Frequency Division Multiplexing) signal received by an antenna 310, to generate an OFDM signal of a baseband (baseband OFDM signal). The wireless communication unit 31 outputs the generated baseband OFMD signal to the communication state detection unit 32, and also obtains data from the generated baseband OFMD signal and outputs the data to the control unit 33. The wireless communication unit 31 generates an OFDM signal including transmission data received from the control unit 33, and wirelessly transmits the OFDM signal via the antenna 310.

The communication state detection unit 32 detects a communication state of communication with the communication partner based on the baseband OFDM signal received from the wireless communication unit 31. Examples of an index of the communication state include the FER (Frame Error Rate), the RSSI (Received Signal Strength Indication), and the SINR (Signal to Interference plus Noise Ratio). The communication state detection unit 32 outputs the FER, the RSSI, the SINR, and the like, as a result of detection of the communication state.

The control unit 33 includes a CPU, a storage unit, and the like. The control unit 33 reads out a program stored in the storage unit and causes the CPU to execute the program, thereby functionally implementing a handover execution control unit 131, a transmission/reception timing adjustment unit 132, and a channel allocation restriction unit 133.

The handover execution control unit 131 determines whether or not to change the connection destination, that is, whether or not to perform a handover, based on the result of detection of the communication state made by the communication state detection unit 32. Furthermore, in a case of performing the handover, the handover execution control unit 131 controls execution of the handover operation.

The transmission/reception timing adjustment unit 132 functions as a determination unit that determines transmission/reception timings for performing communication with a communication device such as the base station 10 and the relay device 50. In a case of performing the handover, the transmission/reception timing adjustment unit 132 changes the transmission/reception timings.

The channel allocation restriction unit 133 requests a communication partner base station to restrict channel allocation. The restriction of the channel allocation is achieved by, in the channel allocation restriction unit 133, generating information (allocation restriction information) concerning channel allocation restriction, incorporating the allocation restriction information into the transmission data, and notifying the base station thereof.

Figure 3:
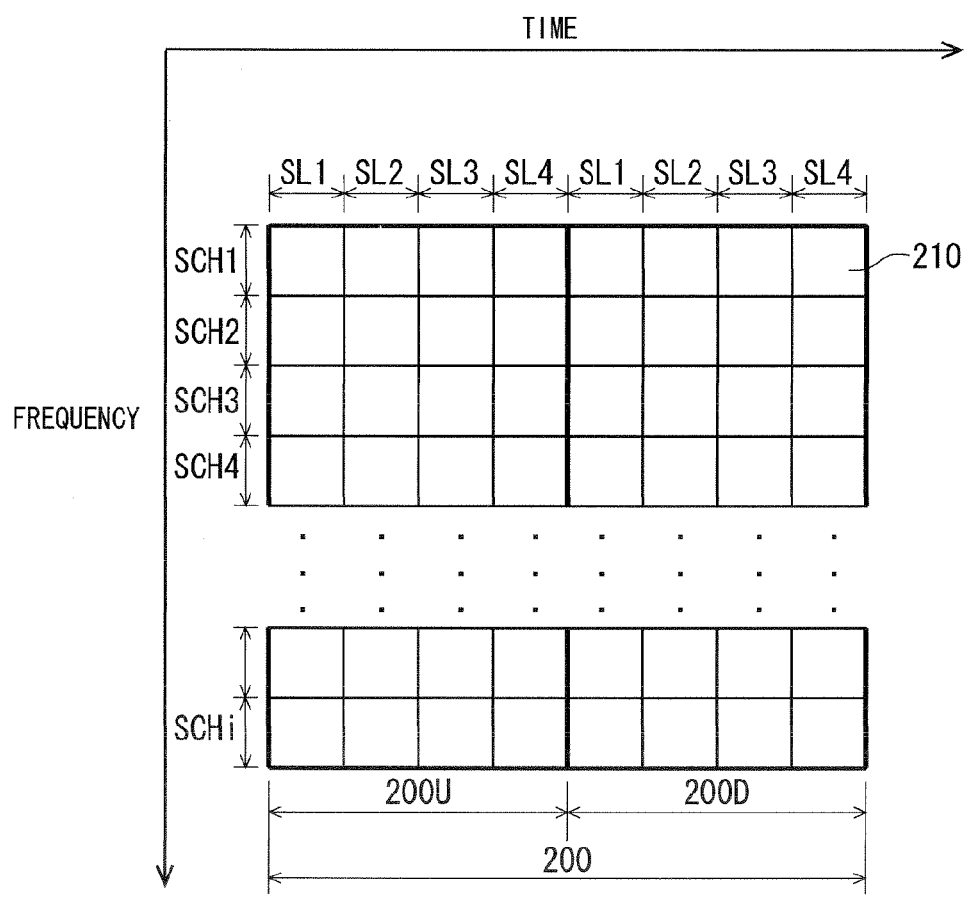
FIG. 3 A diagram showing a configuration of a TDMA/TDD frame.

Here, the radio resource allocated to the communication terminal 30 will be described. FIG. 3 is a diagram showing a configuration of a TDMA/TDD (Time Division Multiple Access/Time Division Duplexing) frame 200.

As shown in FIG. 3, the TDMA/TDD frame 200 is identified on a time-frequency plane with the horizontal axis and the vertical axis thereof representing time and frequency, respectively.

One TDMA/TDD frame 200 (unit TDMA/TDD frame) includes an upstream frame 200U for transmitting an upstream signal from the communication terminal 30 to the base station 10, and a downstream frame 200D for transmitting a downstream signal from the base station 10 to the communication terminal 30. Each of the upstream frame 200U and the downstream frame 200D is divided into four sections in the time direction, and includes a first slot SL1 to a fourth slot SL4. In the TDMA/TDD frame 200, the time width of one slot (unit slot) is set to be 625 µs, and each of the upstream frame 200U and the downstream frame 200D has a time length of 2.5 ms, and the unit TDMA/TDD frame has a time length of 5 ms.

Each of the slots SL1 to SL4 included in the upstream frame 200U will be also referred to as "upstream time slot", and each of the slots SL1 to SL4 included in the downstream frame 200D will be also referred to as "downstream time slot".

The TDMA/TDD frame 200 includes a first sub channel SCH1 to an i-th sub channel SCHi (i>1) in the frequency direction. The bandwidth of one sub channel (unit sub channel) is 900 kHz, and one sub channel includes twenty-four subcarriers.

In the TDMA/TDD frame 200, one slot and one sub channel form one PRU (Physical Resource Unit) 210. The communication between the base station 10 and the communication terminal 30 is performed on a unit basis of this PRU 210. For example, in the base station 10, the allocation of the radio resource to the communication terminal 30 is performed on a unit basis of the PRU 210, and a modulation scheme used for transmitting the transmission data to the communication terminal 30 is determined for each PRU 210.

In each of the upstream frame 200U and the downstream frame 200D, four PRUs 210 are arranged along the time direction, and in the unit TDMA/TDD frame, eight PRUs 210 are arranged along the time direction. In the TDMA/TDD frame 200, i PRUs 210, the number of which is equal the number of the sub channels, are arranged in the frequency direction.

In the next-generation PHS, a common channel (CCH: Common Channel) and an individual channel (ICH: Individual Channel) are specified as functional channels (communication channels).

The common channel is a transmission path (channel) for transmitting information (also referred to as "control information") that is used for establishing communication between the base station 10 and the communication terminal 30. The individual channel is a transmission path that is used after the communication is established between the base station 10 and the communication terminal 30.

The base station 10 and the communication terminal 30 firstly exchange information by using the common channel (initial communication), to establish unique communication between the base station 10 and the communication terminal 30. Then, after the unique communication is established, the base station 10 and the communication terminal 30 exchange information by using the individual channel (individual communication).

In the next-generation PHS, the first sub channel SCH1 of each TDMA/TDD frame 200 is allocated as the common channel, and the other sub channels (the second sub channel SCH2 to the i-th sub channel SCHi) are allocated as the individual channels. Each base station 10 uses the first sub channel as a resource of the common channel, to transmit a signal (also referred to as "CCH signal") including the control information.

In the next-generation PHS, in order to avoid interference between base stations, the autonomous distributed system is adopted in setting of the common channel. To be specific, the base station 10 detects allocation of radio resources as the common channel in another base station (also referred to as "surrounding base station") located in the surroundings, and thereby identifies an empty resource. Then, based on the empty resource thus identified, the base station 10 transmits the CCH signal through a slot (time slot) that is not used in the transmission of the CCH signal of the surrounding base station. This enables the base station 10 to avoid interference with the CCH signal transmitted from the surrounding base station.

Since the control information has a small amount of data, each of the base stations is configured to transmit the control information of the own station at certain intervals (intermittent transmission). Such intermittent transmission of the control information is performed, for example, at intervals of 20 times the time length of the unit TDMA/TDD frame. In each base station 10, the first sub channel SCH1 in a certain time slot is allocated as the common channel in accordance with a timing at which the intermittent transmission of the control information is performed. The TDMA/TDD frame 200 having the time slot to which the common channel is allocated will be also referred to as an intermittent transmission frame.

In the TDMA/TDD frame 200, the functional channel is allocated to each of a pair of upstream and downstream time slots. For example, in a case where, in the intermittent transmission frame, a common channel for upstream communication is allocated to an upstream time slot SL1, a common channel for downstream communication is allocated to a downstream time slot SL1 that is paired with this upstream time slot SL1. The upstream time slot to which the common channel for upstream communication is allocated is a reception timing at which the base station 10 receives the upstream signal from the communication terminal 30. The downstream time slot to which the common channel for downstream communication is allocated is a transmission timing at which the base station 10 transmits the downstream signal to the communication terminal 30.

The allocation of the functional channel is made to a PRU. In other words, the allocation of the functional channel is made on a PRU basis. However, for the purpose of convenience, this specification describes that the functional channel is allocated on a slot basis.

Next, the initial communication for establishing the unique communication between the base station 10 and the communication terminal 30 will be described in detail.

Firstly, the base station 10, after being started up, starts to transmit the CCH signal including the control information (also referred to as "announcement information") of the own station. The transmission of the CCH signal is performed at an intermittent transmission timing that is preset and in accordance with the autonomous distributed system.

The communication terminal 30 receives the CCH signal that is transmitted from the base station 10 at the aforementioned intermittent transmission timing. The reception of the CCH signal by the communication terminal 30 is performed in synchronization with the transmission of the CCH signal by the base station 10.

The communication terminal 30 receives the CCH signals transmitted from the plurality of base stations, and then, based on these CCH signals, identifies a base station to be connected. Then, the communication terminal 30 synchronizes a frame timing with the connection object base station (connected base station), and transmits a channel request to the connected base station. The transmission of the channel request is performed at a timing (upstream time slot) to which the common channel for upstream communication is allocated in this connected base station. In more detail, in a case where the base station 10 is selected as the connected base station, the transmission of the channel request is performed in a particular upstream time slot within a frame synchronized with the intermittent transmission timing at which the base station 10 transmits the control information. That is, the transmission of the channel request is performed in a particular upstream time slot (from the standpoint of the communication terminal 30, a transmission time slot) within a frame synchronized with the intermittent transmission frame of the base station 10. The base station 10 receives the channel request from the communication terminal 30 in an upstream time slot of the own station (a reception time slot of the base station 10) synchronized with this transmission time slot.

The base station 10 receives the channel request, and then, in accordance with the channel request, determines a resource to be used as the individual channel. That is, the base station 10 allocates an empty resource as the individual channel to be used for communication with the communication terminal 30. Then, the base station 10 transmits information (allocation information) concerning the allocation of the individual channel in a transmission time slot to which the common channel is allocated, to notify the communication terminal 30 of the allocation of the individual channel.

The communication terminal 30 receives the individual channel allocation information, and then starts the individual communication with the base station 10 by using the allocated individual channel.

In this manner, in the wireless communication system 100, the initial communication between the base station 10 and the communication terminal 30 is performed through the common channel that is allocated in accordance with the intermittent transmission timing at which the CCH signal is transmitted.

In the wireless communication system 100, in an area where a radio signal from the base station 10 does not reach, the connection between the base station 10 and the communication terminal 30 is achieved with interposition of (via) the relay device 50. FIG. 4 is a block diagram showing a configuration of the relay device 50.

As shown in FIG. 4, the relay device 50 includes a first wireless communication unit 51 for performing wireless communication with the base station 10, a second wireless communication unit 52 for performing wireless communication with the communication terminal 30, and a relay control unit 53 that controls the first wireless communication unit 51 and the second wireless communication unit 52 to perform a process for relaying (relay process).

The relay device 50 with such a configuration has a function for amplifying signals received from the base station 10 and the communication terminal 30 and then re-transmitting the signals. In a relay device, it is difficult to perform reception and re-transmission of a radio signal in real time. Therefore, in the relay device 50 of this embodiment, a certain amount of time lag is provided for a signal relay process. Such a certain amount of time lag is provided in a period from reception of a signal to re-transmission of the signal, in other words, by the time when a signal received by the first wireless communication unit 51 is transmitted from the second wireless communication unit 52 and by the time when a signal received by the second wireless communication unit 52 is transmitted from the first wireless communication unit 51.

In the communication system 100 of this embodiment, a certain time period required from the reception to the re-transmission in the relay device 50 is set to the half the time period of the unit TDMA/TDD frame. That is, the amount of delay occurring in one relay process performed by the relay device 50 is 0.5 frame. Thus, when a signal is exchanged between the base station 10 and the communication terminal 30 via the relay device 50, a delay corresponding to one frame occurs in the transmission/reception timing of the base station 10 and the communication terminal 30. In the relay device 50, to ensure a certain amount of delay, a buffer (not shown) for temporarily storing received signals is provided.

[Handover Operation]

Next, the handover operation performed by the communication terminal 30 will be described. FIG. 5 is a diagram showing a switching destination in the handover.

As shown in FIG. 5, in a case where the handover operation is performed in the communication terminal 30, another base station or the relay device 50 serves as a switching destination to be connected, that is, as a new connection destination (also referred to as "movement destination").

For example, a situation where another base station serves as the switching destination occurs in a case where, in FIG. 1, the communication terminal 30 (301) moves in the direction of the arrow YE so that the position of the communication terminal 301 goes out of the service area SA1 of the base station 10A and enters the service area SA2 of the base station 10B. In this case, as a result of the handover, the connection destination of the communication terminal 30 is switched from the base station 10A to the base station 10B. Here, the situation where another base station serves as the switching destination will be also referred to as "first mode".

On the other hand, as shown in FIG. 5, as a situation where the relay device 50 serves as the switching destination, there are cases where a base station (also referred to as "relay destination base station") to which relaying is made by the relay device 50 is the same as a movement source base station that has been the destination before the handover, and where the relay destination base station is different from the movement source base station that has been the destination before the handover.

The case where the relay device 50 serves as the switching destination and the relay destination base station is the same as the movement source base station occurs when, for example, in FIG. 1, the communication terminal 301 moves in the direction of the arrow YJ2 so that the position of the communication terminal 301 goes out of the service area SA1 of the base station 10A and enters the service area SA3 of the relay device 50A. In this case, as a result of the handover, the connection destination of the communication terminal 30 is switched from the base station 10A to the relay device 50A that relays to this base station 10A. In this manner, the situation where the relay device 50 serves as the switching destination and the relay destination base station is the same as the movement source base station will be also referred to as "second mode".

The case where the relay device 50 serves as the switching destination and the relay destination base station is different from the movement source base station occurs when, for example, in FIG. 1, the communication terminal 301 moves in the direction of the arrow YJ3 so that the position of the communication terminal 301 goes out of the service area SA1 of the base station 10A and enters the service area SA4 of the relay device 50B. In this case, as a result of the handover, the connection destination of the communication terminal 30 is switched from the base station 10A to the relay device 50B that relays to another base station 10B. In this manner, the situation where the relay device 50 serves as the switching destination and the relay destination base station is different from the movement source base station will be also referred to as "third mode".

In the following, the handover operation performed by the communication terminal 30 in each of the first mode, the second mode, and the third mode will be described.

Figure 6:
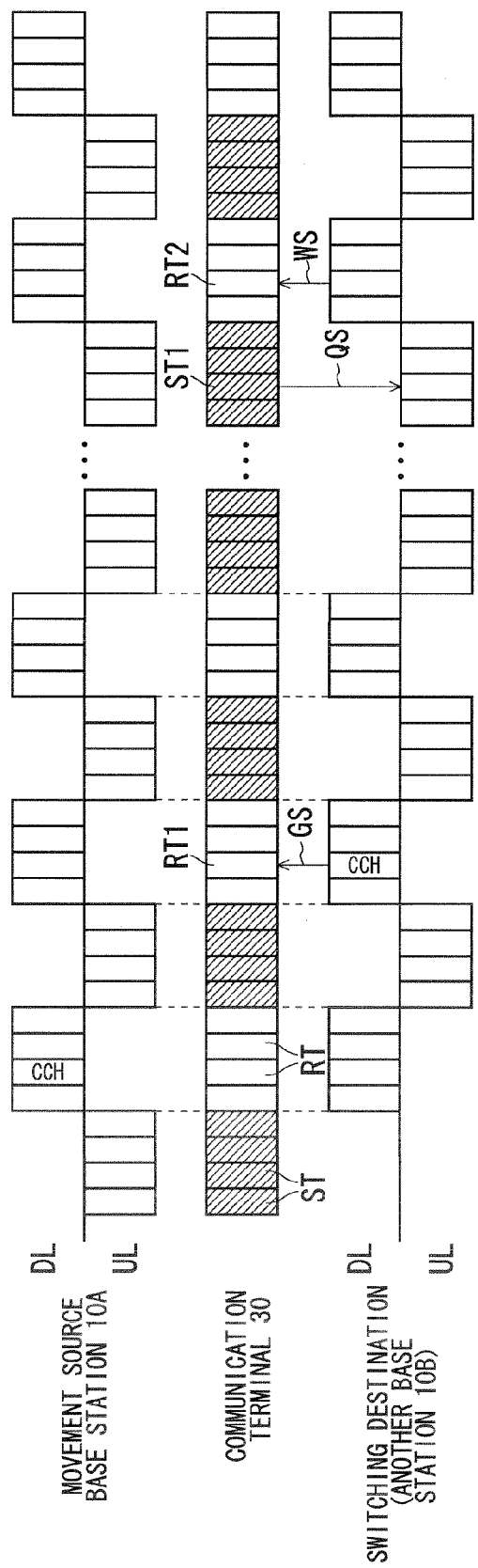
FIG. 6 A diagram for explaining a handover operation according to a first mode.

Firstly, a description will be given to the handover operation in the first mode, that is, in a case where another base station serves as the switching destination. FIG. 6 is a diagram for explaining the handover operation according to the first mode. FIG. 6 shows, in time series, the TDMA/TDD frame 200 of the movement source base station 10A that has been the destination before the switching, the TDMA/TDD frame 200 of the communication terminal 30, and the TDMA/TDD frame 200 of another base station 10B serving as the switching destination. In the TDMA/TDD frame 200 of the movement source base station 10A, an UL side frame is the upstream frame 200U for transmitting the upstream signal from the communication terminal 30 to the movement source base station 10A, and a DL side frame is the downstream frame 200D for transmitting the downstream signal from the movement source base station 10A to the communication terminal 30. In the TDMA/TDD frame 200 of another base station 10B serving as the switching destination, an UL side frame is the upstream frame 200U for transmitting the upstream signal from the communication terminal 30 to another base station 10B, and a DL side frame is the downstream frame 200D for transmitting the downstream signal from another base station 10B to the communication terminal 30. In the TDMA/TDD frame 200 of the communication terminal 30, the hatched time slots indicate transmission slots ST for transmitting the upstream signals from the communication terminal 30 to the movement source base station 10A and to another base station 10B, and the white time slots indicate reception slots RT for receiving the downstream signals supplied to the communication terminal 30 from the movement source base station 10A and another base station 10B.

The handover is implemented by, under control of the handover execution control unit 131, sequentially performing a search step of searching for switching destination candidates, a selection step of selecting a switching destination from the candidates obtained as a result of the searching, and a communication establishing step of establishing communication with the switching destination thus selected.

To be specific, in the search step, the communication terminal 30 receives the CCH signals of the surrounding base stations in the reception slots RT at the intermittent transmission timings of the respective surrounding base stations, and thereby searches for the switching destination candidates. FIG. 6 shows a situation where the communication terminal 30 receives, in a reception slot RT1, a CCH signal GS of another base station 10B that is the switching destination candidate. If the switching destination candidate is found and the search step ends, an operation procedure moves to the selection step.

In the selection step, the switching destination is selected from the candidates obtained as a result of the searching. The selection of the switching destination is performed by the handover execution control unit 131 based on the result of detection of the communication state made by the communication state detection unit 32. After the switching destination is selected, the operation procedure moves to the communication establishing step.

In the communication establishing step, while the communication with the movement source base station is continuing, the initial communication is performed for establishing the unique communication between the communication terminal 30 and another base station (movement destination base station) selected as the switching destination.

To be specific, the communication terminal 30 transmits the channel request based on the control information included in the CCH signal supplied from the movement destination base station. The transmission of the channel request by the communication terminal 30 is performed at an intermittent transmission timing that comes again, in other words, at a timing to which the common channel is allocated again in the movement destination base station. FIG. 6 shows a situation where the communication terminal 30 transmits a channel request QS to another base station 10B selected as the switching destination in a transmission slot ST1 synchronized with the timing to which the common channel is allocated in another base station 10B.

The movement destination base station receives the channel request, and then, in accordance with this channel request, allocates an empty resource as the individual channel to be used for communication with the communication terminal 30. The movement destination base station transmits the information (allocation information) concerning the allocation of the individual channel at a timing that is paired with the timing at which the channel request has been received, to notify the communication terminal 30 of the allocation of the individual channel.

The communication terminal 30 receives the individual channel allocation information from the movement destination base station. FIG. 6 shows a situation where the communication terminal 30 receives allocation information WS transmitted from another base station 10B, in a reception slot RT2 synchronized with the transmission timing that is paired with the reception timing at which the channel request has been received in another base station 10B.

After receiving the individual channel allocation information, the communication terminal 30 ends the initial communication that is for establishing the unique communication, and starts the individual communication with the movement destination base station by using the allocated individual channel. Then, along with the start of the individual communication, the communication terminal 30 ends the communication with the movement source base station.

Through the above-described operation procedure, the communication terminal 30 sequentially performs the search step, the selection step, and the communication establishing step, to switch the connection destination from the movement source base station to another base station. Thus, the handover operation according to the first mode is completed.

Figure 7:
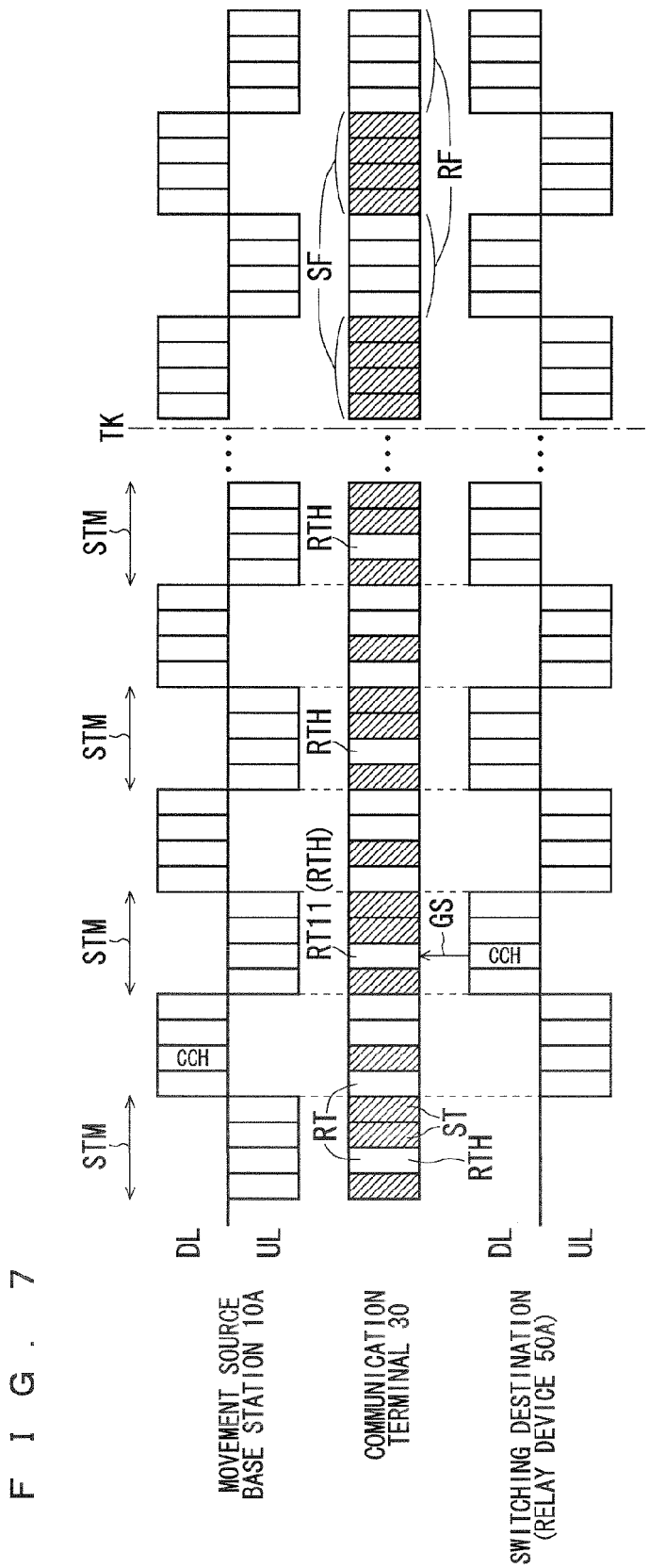
FIG. 7 A diagram for explaining a handover operation according to a second mode.

Next, a description will be given to the handover operation in the second mode, that is, in a case where the relay device 50 serves as the switching destination and the relay destination base station is the same as the movement source base station. FIG. 7 is a diagram for explaining the handover operation according to the second mode. FIG. 7 shows, in time series, the TDMA/TDD frame 200 of the movement source base station 10A that has been the destination before the switching, the TDMA/TDD frame 200 of the communication terminal 30, and the TDMA/TDD frame 200 of the relay device 50A serving as the switching destination. In the TDMA/TDD frame 200 of the movement source base station 10A, an UL side frame is the upstream frame 200U for transmitting the upstream signal from the communication terminal 30 to the movement source base station 10A, and a DL side frame is the downstream frame 200D for transmitting the downstream signal from the movement source base station 10A to the communication terminal 30. In the TDMA/TDD frame 200 of the relay device 50A serving as the switching destination, an UL side frame is the upstream frame 200U for transmitting the upstream signal from the communication terminal 30 to the relay device 50A, and a DL side frame is the downstream frame 200D for transmitting the downstream signal from the relay device 50A to the communication terminal 30. In the TDMA/TDD frame 200 of the communication terminal 30, the hatched time slots indicate transmission slots ST for transmitting the upstream signals from the communication terminal 30 to the movement source base station 10A and to the relay device 50A, and the white time slots indicate reception slots RT for receiving the downstream signals supplied to the communication terminal 30 from the movement source base station 10A and the relay device 50A.

As described above, the handover is implemented by, under control of the handover execution control unit 131, sequentially performing the search step, the selection step, and the communication establishing step. Also in the handover operation according to the second mode, the above-described three steps are performed. However, in the handover operation according to the second mode, since the relay device 50 serves as the switching destination, the handover operation is performed in consideration of the amount of delay occurring in the relay device 50.

To be specific, in the search step in the second mode, the communication terminal 30 searches for the switching destination candidates while causing the transmission/reception timing adjustment unit 132 to change the signal transmission/reception timings. In more detail, the communication terminal 30 changes a transmission timing in the communication with the movement source base station into a reception timing, and receives the CCH signal transmitted from the relay device 50.

For example, FIG. 7 shows a situation where the communication terminal 30 sets a reception slot RT11 to a timing that has been the transmission timing in the communication with the movement source base station 10A, and by using this reception slot RT11, receives the CCH signal GS from the relay device 50A serving as the switching destination candidate.

An operation for changing the transmission/reception timings which is performed in order to receive the CCH signal transmitted from the relay device 50 is also expressed as an operation for changing a part of a transmission period of the communication terminal 30 into a reception period. In a case of adopting such an expression, the transmission/reception timing adjustment unit 132 can be also referred to as a determination unit that determines transmission and reception periods of the communication terminal 30. The transmission period of the communication terminal 30 means a period in which the transmission slot ST for transmitting the upstream signal from the communication terminal 30 to the movement source base station 10A is set. For example, FIG. 7 shows a situation where, in the communication terminal 30, a reception slot RTH is set in a part of a transmission period STM that is originally a period in which the transmission slot should be set. In the communication terminal 30, as shown in FIG. 7, if a transmission slot is changed into a reception slot, a reception slot that is paired with this transmission slot is changed into a transmission slot.

Since, in this manner, the transmission/reception timings are changed in the communication terminal 30, the communication terminal 30 can receive the CCH signal from the relay device 50, which is delayed by 0.5 frame as compared with the movement source base station.

In the second mode, the relay destination base station is the same as the movement source base station. Therefore, a timing to change transmission and reception operations in the communication terminal 30 in order to receive the CCH signal from the relay device 50 can be identified by adding the amount of delay (corresponding to 0.5 frame) occurring in the relay device 50 to the timing at which the CCH signal is received from the movement source base station.

Additionally, prior to changing the transmission/reception timings, the communication terminal 30 requests the movement source base station currently in communication therewith to restrict the channel allocation. The restriction of the channel allocation is performed in order to inhibit a channel from being allocated to a time slot that corresponds to a slot in which the change of the transmission/reception timings is expected to occur in the communication terminal 30. The movement source base station, in which the channel allocation is restricted, is restricted from allocating the individual channel to the time slot to which the channel allocation is inhibited.

In this manner, the allocation of the individual channel is restricted in the transmission/reception timings changed by the transmission/reception timing adjustment unit 132. This can avoid a situation where the individual channel is allocated to the reception time slot of the movement source base station, in which the signal is no longer transmitted by the communication terminal 30 because of the change of the transmission/reception timings. As a result, an efficient use of the radio resources is achieved. Moreover, in this embodiment, if a transmission time slot is changed into a reception time slot in the communication terminal 30, a reception time slot that is paired with this transmission time slot is changed into a transmission time slot. This can avoid a situation where the individual channel is allocated to the transmission time slot of the movement source base station, in which the signal is no longer receivable by the communication terminal 30 because of the change of the transmission/reception timings. As a result, an efficient use of the radio resources is achieved. The restriction of allocation of the individual channel, which is put on the movement source base station, is performed by the channel allocation restriction unit 133. The allocation restriction information generated by the channel allocation restriction unit 133 is, in a TDMA Slot Limitation Request, notified as a message by using the individual channel.

After the CCH signal is received from the relay device 50 serving as the switching destination candidate and the search step ends, the operation procedure moves to the selection step.

In the selection step, the relay device 50 serving as the switching destination candidate is selected as the switching destination, and then the operation procedure moves to the communication establishing step.

In the second mode, the relay destination base station is the same as the movement source base station, and therefore the initial communication is not performed in the communication establishing step. Thus, in the communication establishing step, the communication terminal 30, without performing the initial communication, changes the transmission/reception timings of the communication terminal 30 in accordance with the transmission/reception timings of the relay device 50, to start the individual communication via the relay device 50. Along with the start of the individual communication, the communication terminal 30 ends the communication with the movement source base station. FIG. 7 shows a transmission frame SF and a reception frame RF of the communication terminal 30 obtained as a result of the change being made in accordance with the transmission/reception timings of the relay device 50 after a time when the individual communication is started as indicated by the alternate long and short dash line TK.

Through the above-described operation procedure, the communication terminal 30 switches the connection destination from the movement source base station to the relay device 50 that relays to this movement source base station. Thus, the handover operation according to the second mode is completed.

Figure 8:
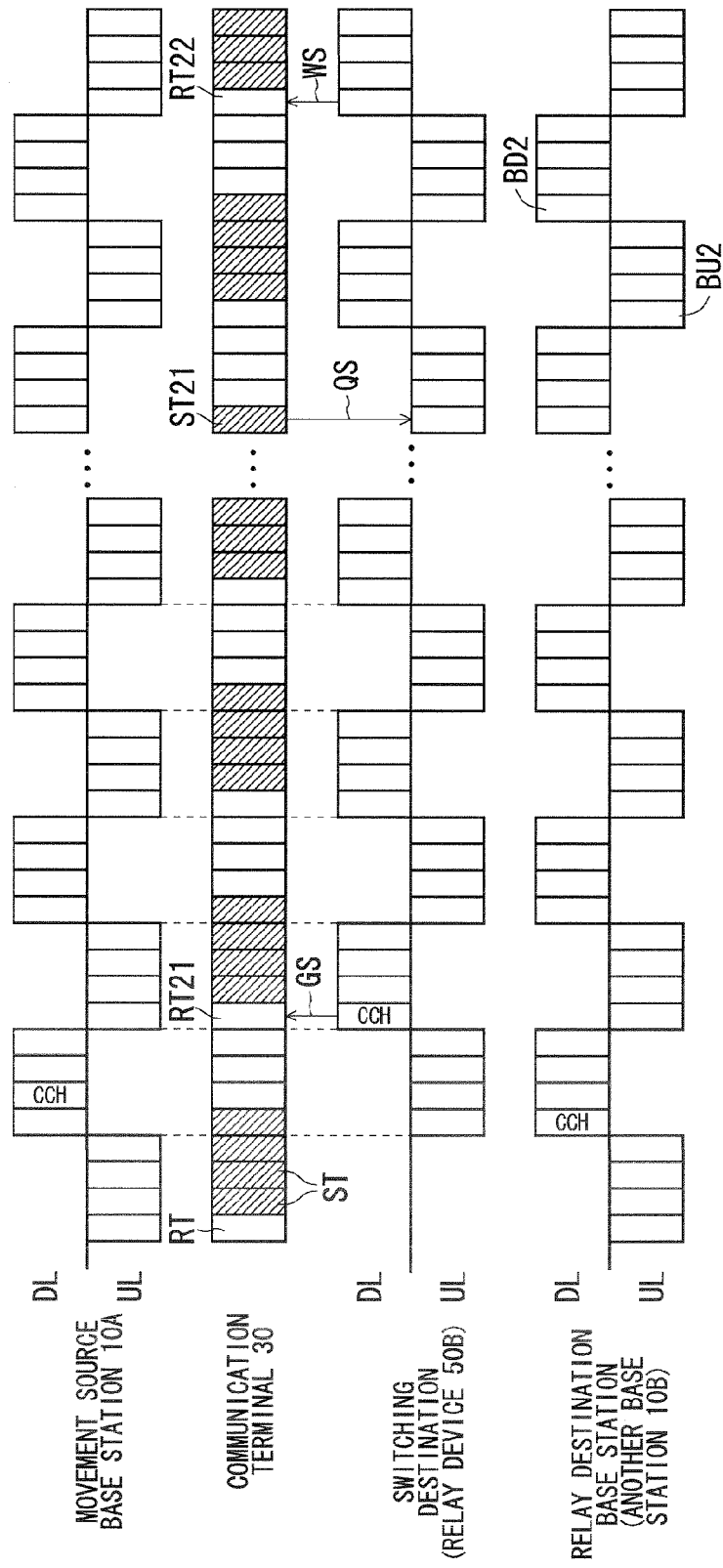
FIG. 8 A diagram for explaining a handover operation according to a third mode.
Figure 9:
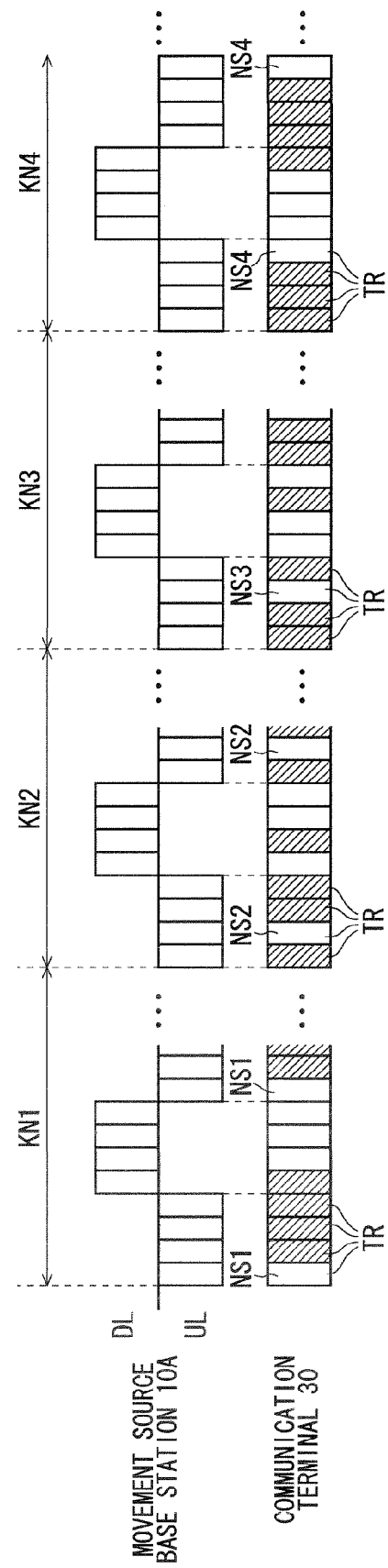
FIG. 9 A diagram showing a situation where transmission/reception timings are changed in the communication terminal.

Next, a description will be given to the handover operation in the third mode, that is, in a case where the relay device 50 serves as the switching destination and the relay destination base station is different from the movement source base station. FIG. 8 is a diagram for explaining the handover operation according to the third mode. FIG. 9 is a diagram showing a situation where the transmission/reception timings are changed in the communication terminal 30.

FIG. 8 shows, in time series, the TDMA/TDD frame 200 of the movement source base station 10A that has been the destination before the switching, the TDMA/TDD frame 200 of the communication terminal 30, the TDMA/TDD frame 200 of the relay device 50B serving as the switching destination, and the TDMA/TDD frame 200 of the relay destination base station (another base station 10B). FIG. 9 shows, in time series, the TDMA/TDD frame 200 of the movement source base station 10A that has been the destination before the switching, and the TDMA/TDD frame 200 of the communication terminal 30. In the TDMA/TDD frame 200 of the movement source base station 10A, an UL side frame is the upstream frame 200U for transmitting the upstream signal from the communication terminal 30 to the base station 10A, and a DL side frame is the downstream frame 200D for transmitting the downstream signal from the base station 10A to the communication terminal 30. In the TDMA/TDD frame 200 of the relay device 50B serving as the switching destination, an UL side frame is the upstream frame 200U for transmitting the upstream signal from the communication terminal 30 to the relay device 50B, and a DL side frame is the downstream frame 200D for transmitting the downstream signal from the relay device 50B to the communication terminal 30. In the TDMA/TDD frame 200 of the relay destination base station, an UL side frame is the upstream frame 200U for transmitting the upstream signal from the relay device 50B to the relay destination base station, and a DL side frame is the downstream frame 200D for transmitting the downstream signal from the relay destination base station to the relay device 50B. In the TDMA/TDD frame 200 of the communication terminal 30, the hatched time slots indicate transmission slots ST for transmitting the upstream signals from the communication terminal 30 to the movement source base station 10A and to the relay device 50B, and the white time slots indicate reception slots RT for receiving the downstream signals supplied to the communication terminal 30 from the movement source base station 10A and the relay device 50B.

Also in the handover operation according to the third mode, the search step, the selection step, and the communication establishing step are sequentially performed. However, in the handover operation according to the third mode, since the relay device 50 serves as the switching destination, the handover operation is performed in consideration of the amount of delay occurring in the relay device 50.

To be specific, in the search step in the third mode, the communication terminal searches for the switching destination candidates while causing the transmission/reception timing adjustment unit 132 to change the signal transmission/reception timings. In more detail, the communication terminal 30 changes a timing that has been the transmission timing in the communication with the movement source base station, into a reception timing, and receives the CCH signal transmitted from the relay device 50.

For example, FIG. 8 shows a situation where the communication terminal 30 sets a reception slot RT21 to a timing that has been the transmission timing in the communication with the movement source base station 10A, and by using this reception slot RT21, receives the CCH signal GS from the relay device 50B serving as the switching destination candidate. In the communication terminal 30, as shown in FIG. 8, if a transmission slot is changed into a reception slot, a reception slot that is paired with this transmission slot is changed into a transmission slot.

Since, in this manner, the transmission/reception timings are changed in the communication terminal 30, the communication terminal 30 can receive the CCH signal from the relay device 50, which is delayed by 0.5 frame as compared with the movement source base station.

In the third mode, the relay destination base station cannot be identified. Therefore, in the communication terminal 30, a timing to change the transmission and reception operations in the communication terminal 30 in order to receive the CCH signal from the relay device 50 cannot be identified. Accordingly, in the third mode, all the timings that have been the transmission timings in the communication with the movement source base station are sequentially changed into reception timings, to receive the CCH signal transmitted from the relay device 50. In more detail, the communication terminal 30 changes, one by one, the four transmission slots ST of the unit TDMA/TDD frame set to the communication terminal 30, into the reception slot RT, to receive the CCH signal via the relay device 50.

For example, as shown in FIG. 9, in a case where, in a zone KN1, a first slot NS1 among four slots TR that originally should be set as the transmission slots is changed into a reception slot, then in a next zone KN2, a second slot NS2 among four slots that originally should be set as the transmission slots ST is changed into a reception slot. Subsequently, a reception slot to be changed is sequentially shifted. A third slot NS3 in a zone KN3, and a fourth slot NS4 in a zone KN3, are changed into reception slots.

It is preferable that such a change from the transmission slot ST into the reception slot RT is performed at a regular interval that is longer than the interval of the intermittent transmission. In other words, in FIG. 9, it is preferable that each interval between the zones KN1, KN2, KN3, and KN4 is set longer than the interval of the intermittent transmission.

Similarly to the second mode, prior to changing the transmission/reception timings, the communication terminal 30 requests the movement source base station currently in communication therewith to restrict the channel allocation. This can avoid a situation where the individual channel is allocated to the reception time slot of the movement source base station, in which the signal is no longer transmitted by the communication terminal 30 because of the change of the transmission/reception timings in the communication terminal 30. This can also avoid a situation where the individual channel is allocated to the transmission time slot of the movement source base station, in which the signal is no longer receivable by the communication terminal 30 because of the change of the transmission/reception timings in the communication terminal 30. As a result, an efficient use of the radio resources is achieved.

After the CCH signal is received from the relay device 50 serving as the switching destination candidate and the search step ends, the operation procedure moves to the selection step.

In the selection step, the relay device 50 serving as the switching destination candidate is selected as the switching destination, and then the operation procedure moves to the communication establishing step.

In the communication establishing step, while the communication with the movement source base station is continuing, the initial communication is performed for establishing the unique communication between the communication terminal 30 and the relay device 50 selected as the switching destination.

To be specific, the communication terminal 30 transmits the channel request based on the control information included in the CCH signal supplied from the relay device 50. The transmission of the channel request by the communication terminal 30 is performed in such a manner that this channel request can arrive at a timing to which the common channel is allocated in the relay destination base station. That is, the communication terminal 30 transmits the channel request at a timing that is 0.5 frame prior to the timing to which the common channel is allocated in the relay destination base station.

FIG. 8 shows a situation where the communication terminal 30 transmits the channel request QS to the relay device 50B selected as the switching destination in a transmission slot ST21 at a timing that is 0.5 frame prior to the timing to which the common channel is allocated in the relay destination base station (here, another base station 10B).

At a time point when, in the search step, the transmission/reception timings are changed and the CCH signal is received, it is possible for the communication terminal 30 to identify the intermittent transmission timing of the relay destination base station. Therefore, a timing to transmit the channel request in advance can be determined.

In the channel request, the communication terminal 30 requests the relay destination base station to restrict allocation of the individual channel, because the communication with the movement source base station continues until the unique communication with the relay destination base station is established. The restriction of allocation of the individual channel, which is put on the relay destination base station, is performed in order to restrict allocation of the individual channel to a timing other than the transmission/reception timings changed by the transmission/reception timing adjustment unit 132. This can avoid a situation where the radio resource used for the communication with the movement source base station until the unique communication between the communication terminal 30 and the relay destination base station is established is allocated as the individual channel. Accordingly, the communication with the movement source base station can be continued, and moreover an efficient use of the radio resources is achieved. The restriction of allocation of the individual channel, which is put on the relay destination base station, is performed by the channel allocation restriction unit 133. The allocation restriction information generated by the channel allocation restriction unit 133 is, in a TMD Slot within a LCH Assignment Re-request, notified by using the common channel.

The relay destination base station receives the channel request, and then, in accordance with this channel request, allocates an empty resource as the individual channel to be used for the unique communication with the communication terminal 30. Then, the relay destination base station transmits allocation information concerning the allocation of the individual channel at a timing that is paired with the timing at which the channel request has been received, to notify the communication terminal 30 of the allocation of the individual channel.

To be specific, in FIG. 8, the channel request is received in a reception time slot BU2 of the relay destination base station (another base station 10B), and the allocation information is transmitted in a transmission time slot BD2 of the relay destination base station.

The communication terminal 30 receives the individual channel allocation information from the relay device 50. FIG. 8 shows a situation where the communication terminal 30 receives the allocation information WS from the relay device 50B in a reception slot RT22 that is delayed by 0.5 frame as compared with the timing at which the allocation information is transmitted from the relay destination base station.

After receiving the individual channel allocation information, the communication terminal 30 ends the initial communication that is for establishing the unique communication, and starts the individual communication with the relay destination base station via the relay device 50 by using the allocated individual channel. Then, along with the start of the individual communication, the communication terminal 30 ends the communication with the movement source base station. At a time when the individual communication is started, the transmission/reception timings of the communication terminal 30 are changed in accordance with the transmission/reception timings of the relay device 50. Moreover, at the time when the individual communication is started, the restriction of allocation of the individual channel, which has been put on the relay destination base station, is released.

Through the above-described operation procedure, the communication terminal 30 switches the connection destination from the movement source base station to the relay device 50 that relays to another base station different from the movement source base station. Thus, the handover operation according to the third mode is completed.

In the above, the handover operations in the first mode, the second mode, and the third mode have been described in sequence. However, in an actual handover operation, the handover operations in the first mode, the second mode, and the third mode described above are combined as appropriate.

For example, firstly, the search step and the selection step in the first mode are performed, and in a case where a desired switching destination that satisfies a predetermined criterion can be identified as the switching destination, the handover operation in the first mode is continuously performed. On the other hand, in a case where no desired switching destination can be identified when the search step and the selection step in the first mode are performed, the handover operations in the second mode and the third mode may be performed in order to identify the desired switching destination.

Alternatively, it may be also possible that all the search steps in the first mode, the second mode, and the third mode are performed and then a most suitable switching destination is selected from switching destination candidates obtained as a result of the searching. In this case, the communication establishing step of the handover operation in the mode in which the most suitable switching destination has been searched for is continuously performed, to implement the handover.

As described above, the communication terminal 30 includes the wireless communication unit 31 for transmitting and receiving the radio signals, and the determination unit (transmission/reception timing adjustment unit 132) for determining the transmission period and the reception period in which the wireless communication unit 31 transmits and receives the radio signals. In a case where the connection destination is switched from a first communication device currently in communication into a second communication device, when the second communication device transmits a predetermined signal (for example, the CCH signal) in the transmission period for the communication with the first communication device, the determination unit changes a part of the transmission period for the communication with the first communication device into a reception period, to receive the predetermined signal from the second communication device. This can increase the possibility of implementing the handover while continuing the communication, even in a case where the communication system 100 includes communication devices whose transmission timings of transmitting the radio signals are different from each other.

<Modification>

While an embodiment of the present invention has been described above, the present invention is not limited to the above-described embodiment.

For example, in the embodiment described above, the relay device 50 relays a signal supplied from a relay source while delaying the signal by 0.5 frame. However, this is not limiting, and the amount of delay in the relay device 50 may be changeable.

To be specific, the amount of delay in the relay device 50 may be set to be N frames (N is an integer equal to or greater than one) or (M+0.5) frames (M is an integer equal to or greater than zero), as long as the base station 10 allocates the upstream common channel and the downstream common channel to slots located in the same position in the upstream frame 200U and in the downstream frame 200D of the TDMA/TDD frame 200. In other words, the amount of delay in the relay device 50 may be set such that double the amount thereof is equal to an integer multiple of the frame length. The amount of delay herein means the amount of delay caused by one relay.

In the embodiment described above, the change of the transmission/reception timings of the communication terminal 30 in the search step in the third mode is made with respect to each one of the slots. However, this is not limiting. More specifically, the transmission/reception timings in a plurality of slots may be simultaneously changed. Since it is necessary to maintain the communication with the movement source base station, the maximum number of slots for which the transmission/reception timings can be simultaneously changed is three.

In the embodiment described above, the relay device 50 transmits a signal received from the relay source to the relay destination without performing frequency conversion thereon. However, this is not limiting, and it may be acceptable that the relay device 50 transmits a signal received from the relay source to the relay destination while performing frequency conversion thereon.

To be specific, in a case where the relay device 50 transmits a signal received from the relay source to the relay destination while performing frequency conversion thereon, a frequency band used by the first wireless communication unit 51 at the base station side for communication with the base station 10 is different from a frequency band used by the second wireless communication unit 52 at the communication terminal side for communication with the communication terminal 30. That is, the frequency band of the first sub channel SCH1 to the i-th sub channel SCHi used for the communication between the base station 10 and the relay device 50 is different from the frequency band of the first sub channel SCH1 to the i-th sub channel SCHi used for the communication between the relay device 50 and the communication terminal 30.

In this manner, by using different frequency bands between communication at the base station side and communication at the communication terminal side, occurrence of cross talk between the communications can be avoided. For example, even if a transmission signal of the communication terminal 30 that is communicating with the base station 10 via the relay device 50 directly reaches the base station 10, this transmission signal is prevented from becoming an interference wave in the base station 10.

In the relay device 50 configured to change a frequency band used for communication, there is a possibility that a delay due to a frequency conversion process occurs in a period from reception to re-transmission. In the XGP, the communication is performed while transmission/reception timings are fixedly synchronized between the base station 10 and the communication terminal 30. Therefore, in a case of performing communication by using the relay device 50 that causes a delay due to the frequency conversion process, there is a possibility that communication cannot be performed between the base station 10 and the communication terminal 30. In this case as well, the base station 10 of the above-described embodiment enables communication between the base station 10 and the communication terminal 30.

The relay device 50 is not limited to the one configured to change the frequency band between communication at the base station side and communication at the communication terminal side.

In the embodiment described above, it is preferable that the interval (intermittent transmission interval) of the intermittent transmission of the control information is set to be an integer multiple of the value obtained by doubling the amount of delay caused by one relay in the relay device 50. Setting the interval of the intermittent transmission in accordance with such a rule enables the best improvement in the efficiency of allocation of common channels by a plurality of base stations. The interval of the intermittent transmission can also be expressed as the interval of allocation of the common channel for downstream communication to the TDMA/TDD frame 200, and the interval of allocation of the common channel for upstream communication to the TDMA/TDD frame 200.

In the embodiment described above, the handover from the base station 10 to the relay device 50 has been described. Additionally, the handover from the relay device 50 to the base station 10 can also be achieved by the same method.

In the embodiment and the modifications described above, a case where the present invention is applied to the next-generation PHS has been described. However, the present invention is applicable to other communication systems. For example, the present invention is also applicable to the LTE (Long Term Evolution) or the WiMAX (Worldwide Interoperability for Microwave Access).

While the invention has been described in detail, the foregoing description is in all aspects illustrative and not restrictive. It will be appreciated that numerous modifications unillustrated herein can be made without departing from the scope of the present invention.

DESCRIPTION OF THE REFERENCE NUMERALS

100 wireless communication system
10, 10A, 10B base station
30, 301, 302 communication terminal
31 wireless communication unit
131 handover execution control unit
132 transmission/reception timing adjustment unit
133 channel allocation restriction unit
50, 50A, 50B relay device
GS CCH signal
QS channel request
WS allocation information
The invention claimed is:

1. A communication terminal comprising:
a communication unit for transmitting and receiving radio signals;
a control unit coupled to the communication unit, comprising:
a determination unit for determining a transmission period and a reception period in which the communication unit transmits and receives radio signals, and
a channel allocation restriction unit for restricting allocation of an individual channel in a radio resource,
wherein, in a handover, in a case where a connection destination is switched from a first communication device currently in communication with the communication unit into a second communication device, when the second communication device transmits a predetermined signal in a transmission period for the communication with the first communication device, the determination unit changes only a part of the transmission period for the communication with the first communication device into a reception period, in order that the communication unit receives the predetermined signal from the second communication device while maintaining communication with the first communication device;
either one of the first communication device and the second communication device is a relay device that relays a radio signal,
the relay device transmits a received radio signal after a certain time period elapses from the reception period; and
where a relay destination of the relay device is a third communication device different from the first communication device, the channel allocation restriction unit causes the relay destination to restrict allocation of the individual channel with respect to a period other than a period that is changed from a transmission period into a reception period by the determination unit.

2. The communication terminal according to claim 1, wherein the channel allocation restriction unit causes the first communication device to restrict allocation of the individual channel with respect to a period that is changed from a transmission period into a reception period by the determination unit while permitting the first communication device to use a common channel.

3. A communication system comprising:
a communication terminal; and
a plurality of communication devices that communicate with the communication terminal,
wherein the plurality of communication devices include a first communication device and a second communication device,
a channel allocation restriction unit for restricting allocation of an individual channel in a radio resource,
the communication terminal includes:
a communication unit for transmitting and receiving radio signals; and
a determination unit for determining a transmission period and a reception period in which the communication unit transmits and receives radio signals, in a handover, in a case where a connection destination is switched from the first communication device currently in communication with the communication unit into the second communication device, when the second communication device transmits a predetermined signal in a transmission period for the communication with the first communication device, the determination unit changes only a part of the transmission period for the communication with the first communication device into a reception period, in order that the communication unit receives the predetermined signal from the second communication device while maintaining communication with the first communication device;
either one of the first communication device and the second communication device is a relay device that relays a radio signal,
the relay device transmits a received radio signal after a certain time period elapses from the reception period; and
where a relay destination of the relay device is a third communication device different from the first communication device, the channel allocation restriction unit causes the relay destination to restrict allocation of the individual channel with respect to a period other than a period that is changed from a transmission period into a reception period by the determination unit.

4. A method for operating a communication terminal, the method comprising the steps of:
   a) performing wireless communication with a first communication device; and
   b) in a handover, in a case where a connection destination is switched from the first communication device currently in communication into a second communication device, and either one of the first communication device and the second communication device is a relay device that relays a radio signal, when the second communication device transmits a predetermined signal in a transmission period for the communication with the first communication device, changing a part of the transmission period for the communication with the first communication device into a reception period, in order that the communication terminal receives the predetermined signal from the second communication device while maintaining communication with the first communication device;
   c) the relay device transmits a received radio signal after a certain time period elapses from the reception period; and
   d) where a relay destination of the relay device is a third communication device different from the first communication device, a the communication terminal causes the relay destination to restrict allocation of an individual channel with respect to a period other than a period that is changed from a transmission period into a reception period by the communication terminal.

* * * * *